United States Patent [19]
Morikawa

[11] Patent Number: 5,223,947
[45] Date of Patent: Jun. 29, 1993

[54] NOISE REDUCTION SYSTEM FOR A VIDEO RECORDER

[75] Inventor: Seiichi Morikawa, Yachiyo, Japan

[73] Assignee: TEAC Corporation, Tokyo, Japan

[21] Appl. No.: 798,663

[22] Filed: Nov. 26, 1991

[30] Foreign Application Priority Data

Nov. 29, 1990 [JP] Japan .................... 2-335209

[51] Int. Cl.⁵ .................. H04N 9/80; H04N 5/213
[52] U.S. Cl. ........................ 358/340; 358/330; 358/327; 358/328; 358/167; 358/36; 360/9.1; 360/33.1
[58] Field of Search .......... 358/340, 335, 336, 330, 358/327, 328, 36, 37, 166, 167, 310, 314; 360/9.1, 33.1

[56] References Cited

U.S. PATENT DOCUMENTS

| | | | |
|---|---|---|---|
| 4,825,289 | 4/1989 | Ohta | 358/167 |
| 5,060,078 | 10/1991 | Mitsuhashi | 358/340 |
| 5,067,026 | 11/1991 | Kaneko | 358/340 |
| 5,079,633 | 1/1992 | Hagino et al. | 358/340 |

*Primary Examiner*—Tommy Chin
*Assistant Examiner*—Khoi Truong
*Attorney, Agent, or Firm*—Woodcock Washburn Kurtz Mackiewicz & Norris

[57] ABSTRACT

A video noise reduction system is incorporated with a video recorder for the elimination of high frequency noise from only the gray level portions of a video signal being retrieved from magnetic tape. The frequency modulated video signal retrieved from the tape is directed through a demodulator into a voltage dependent low pass filter having a cutoff frequency which is normally sufficiently high to pass the unmodulated video signal from the demodulator without attenuation. The frequency modulated video signal is also fed into a band elimination filter having an attenuation band corresponding to the gray level of brightness. The output from the band elimination filter is detected, and a variable voltage is impressed to the low pass filter for lowering its cutoff frequency whenever the frequency modulated video signal has gray frequencies. Alternate embodiments are disclosed in which the cutoff frequency is lowered to different preselected values for different levels of brightness.

10 Claims, 5 Drawing Sheets

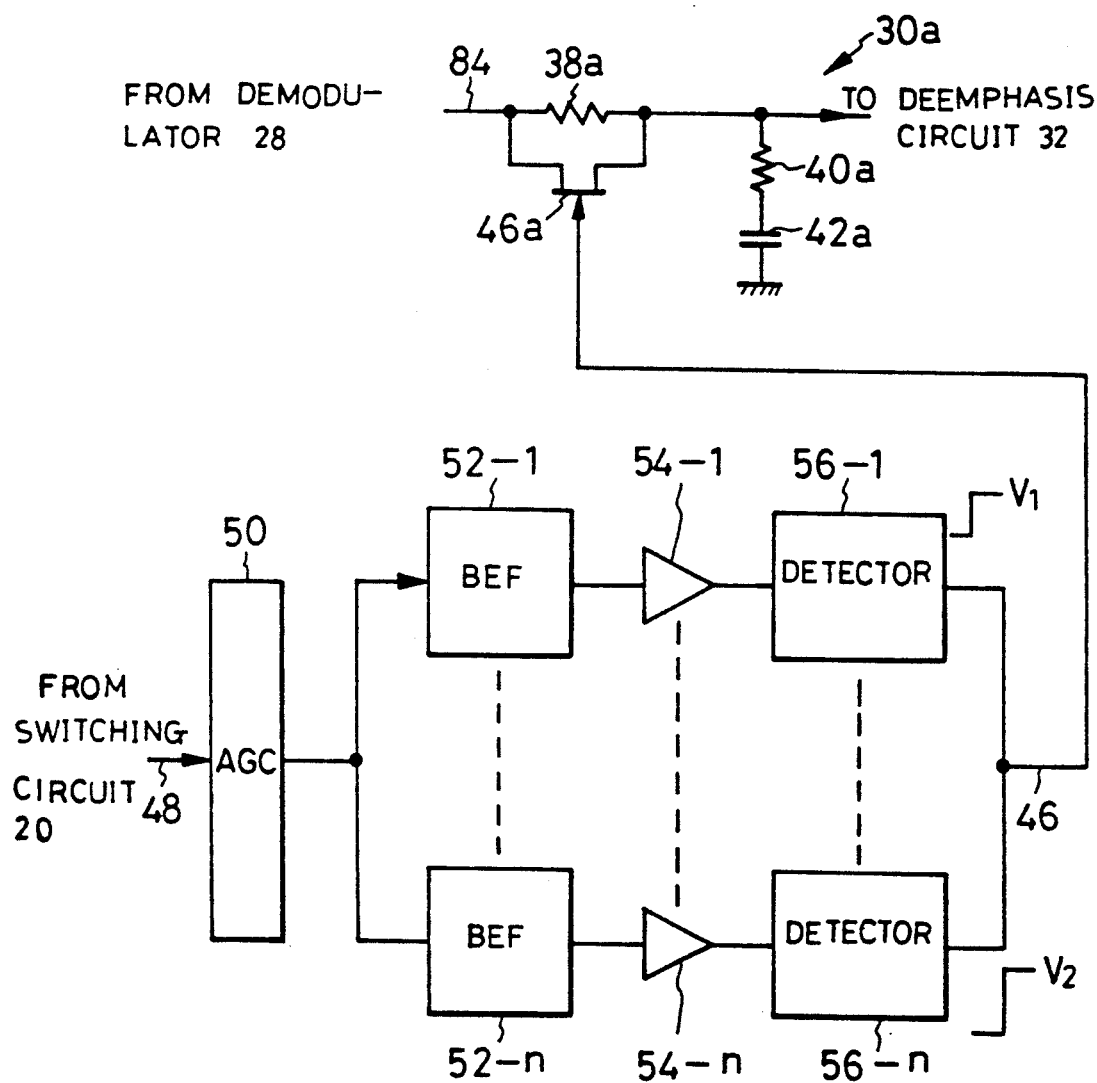

NOISE REDUCTION SYSTEM FOR A VIDEO RECORDER

BACKGROUND OF THE INVENTION

My invention relates to a video playback system which in practice may take the form of what is known as a video tape recorder, by which I mean the device having provisions for both recording video signals on, and playing them back from, magnetic tape packaged in cassette or cartridge form. More particularly, my invention pertains to a system in a video tape recorder or the like for the reduction of noise from frequency modulated picture signals being reproduced from the record medium.

The quality of picture information reproduced by the video tape recorder depends largely upon its signal to noise ratio (SNR) and frequency characteristic. The SNR is a measure of the freedom of the image from noise whereas the frequency characteristic is a measure of image resolution. Video signals might be faithfully reproduced to a high frequency range through improvement of the frequency characteristic. But then the absolute amount of high frequency noise contained in the video signals would also increase. Therefore, for picture reproduction from the same tape, the improvement of both SNR and frequency characteristic is self contradictory.

Noise is produced in video tape recorders by the magnetic tape traveling around the rotary head assembly as well as by their circuit means. I know two conventional approaches to the problem of how to reduce such noise signals.

One such conventional approach is the preemphasis/deemphasis technique. The magnitude of a higher frequency range of a picture signal is increased (preemphasized) at the time of recording and reduced (deemphasized) at the time of reproduction, so that the picture signal is reproduced in its original form. There are, however, many noise components in video playback systems that cannot be eliminated by this known technique. A nonlinear emphasis method has therefore been developed in which the desired frequency range is preemphasized to variable degrees depending upon the varying strengths of the picture signal. This known method is objectionable because of the complex and expensive circuitry required.

The other conventional approach is known as a signal delay noise reduction system. This system employs a field memory or a delay line for determining the similarity or dissimilarity of the successive fractions, each corresponding to one horizontal scanning period, of the picture signal being reproduced. Signal components not closely related with others are removed.

Admittedly, the signal delay noise reduction system is very effective in the case where the reproduced image involves little motion. The trouble is that the similarity of the successive picture signal fractions decreases in inverse proportion to the rapidity of motion in the image represented by that picture signal. This known system hardly works with the picture signal representing rapid motion. I am aware that attempts have been made to defeat this weakness by detecting the varying degrees of motion in the picture signal and adjusting the noise reduction level to the detected degrees. Here again, however, the resulting circuitry is very complex and expensive.

SUMMARY OF THE INVENTION

I have hereby invented how to reduce noise from picture signals being reproduced, with as simple and inexpensive circuitry as possible.

Briefly, my invention may be summarized as a video playback device of the type having transducer means for retrieving a frequency modulated video signal from a record medium, and a demodulator for demodulating the frequency modulated video signal into an unmodulated video signal. More specifically, my invention is directed to a noise reduction system in such a video playback device, comprising a low pass filter connected to an output of the demodulator. The low pass filter has a variable cutoff frequency which is normally sufficiently high to pass the unmodulated video signal from the demodulator without attenuation. The noise reduction system also comprises detector means connected to the transducer means for detecting a preselected band of frequencies included in the frequency modulated video signal being retrieved from the record medium. The detector means is also connected to the low pass filter for decreasing the cutoff frequency thereof to a predetermined value when the frequencies in the preselected band are detected in the frequency modulated video signal.

Thus, as the cutoff frequency of the low pass filter is lowered as above, high frequency noise is removed in real time only from a particular range of brightness represented by the preselected band of frequencies in the frequency modulated video signal. In a preferred embodiment of my invention, the preselected frequency band represents the gray range of brightness, so that high frequency noise is removed only from the gray frequencies. The cutoff frequency of the low pass filter is not lowered when the video signal traveling therethrough represents the other levels of brightness. Consequently, the reproduced image as a whole is appreciably noise free without suffering little or no loss in resolution.

The above and other features and advantages of my invention and the manner of realizing them will become more apparent, and the invention itself will best be understood, from a study of the following description and appended claims, with reference had to the attached drawings showing some preferred embodiments of my invention.

BRIEF DESCRIPTION OF THE DRAWINGS

FIG. 6 is a block diagram of another preferred form of noise reduction system according to my invention.

DESCRIPTION OF THE PREFERRED EMBODIMENTS

Figure 1:
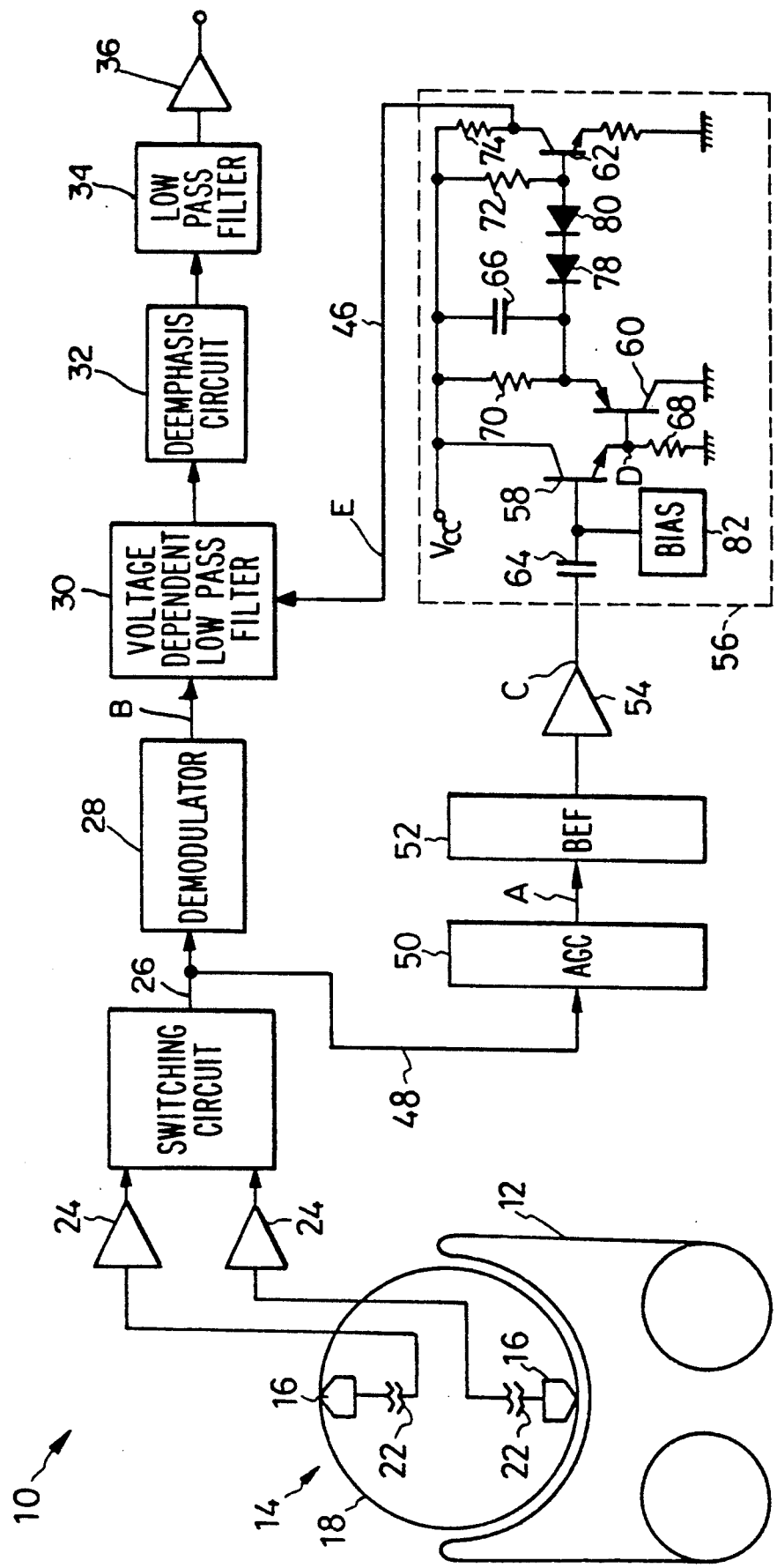
FIG. 1 is a block diagram showing the pertinent parts of a video tape recorder incorporating a preferred form of noise reduction system according to my invention.

I will now describe my invention in detail as embodied in the video tape recorder generally designated 10 in FIG. 1 and therein shown together with a magnetic video tape 12 extending along a predefined transport path. I understand that the tape 12 is conventionally packaged in the form of a cassette or cartridge that can be readily loaded in and unloaded from the video recorder 10. Further, in FIG. 1, I have shown the video recorder 10 very diagrammatically and only insofar as is necessary for a full understanding of the noise reduction system of my invention.

At 14 is seen a rotary transducer assembly disposed along the transport path of the tape 12. The transducer assembly 14 comprises a pair of transducers or video heads 16 mounted to a rotary drum 18 in diametrically opposite positions thereon. As the drum 18 rotates, the video heads 16 alternately scan the tape 12 for recording or retrieving a video signal thereon. Video signals to be recorded on, and retrieved from, the tape 12 may be frequency modulated in the National Television System Committee format.

For playback, the pair of video heads 16 are both electrically coupled to a switching circuit 20, each via a rotary transformer 22 and a preamplifier 24. The switching circuit 20 has an output line 26 connected to a detector or demodulator 28 where the frequency modulated video signal that has been recovered from the tape 12 is demodulated into its original form. The demodulator 28 can be of conventional design comprising a buffer circuit, high pass filter, dropout compensator circuit, and limiter.

Coupled to the output of the demodulator 28 is a voltage dependent low pass filter 30 constituting a feature of my invention. The cutoff frequency of this low pass filter is normally sufficiently high to permit the passage therethrough of practically all the frequency components of the unmodulated video signal from the demodulator 28. The cutoff frequency is to be lowered whenever the frequency modulated video signal from the switching circuit 20 is in a preselected band of frequencies, as will be later explained in more detail. The low pass filter 30 has its output coupled to a deemphasis circuit 32, thence to a low pass filter 34, and thence to an amplifier 36, all in accordance with the prior art.

Figure 2:
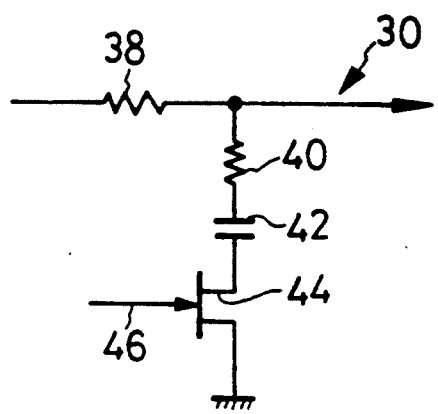
FIG. 2 is a schematic electrical diagram of the voltage dependent low pass filter included in the video tape recorder of FIG. 1.
Figure 3:
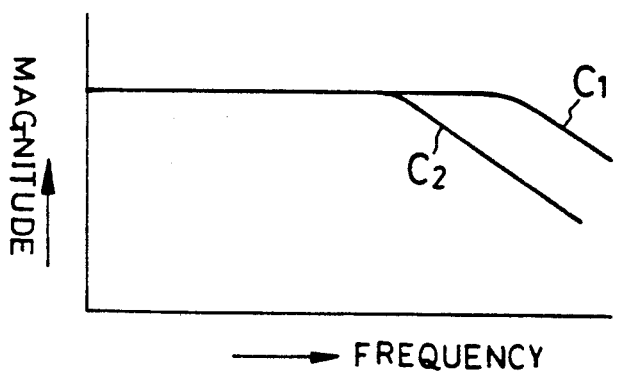
FIG. 3 is a graph explanatory of the frequency characteristics of the voltage dependent low pass filter of FIG. 2.

As illustrated in detail in FIG. 2, the voltage dependent low pass filter 30 comprises two resistors 38 and 40, a capacitor 42, and a voltage dependent variable impedance element shown as a field effect transistor 44. The resistance offered by the field effect transistor 44 varies with a voltage supplied over a line 46, with a consequent change in the frequency characteristic of the low pass filter 30 as graphically represented in FIG. 3. Normally, the low pass filter 30 has the characteristic curve $C_1$ in FIG. 3, as it is required to have when the image being reproduced contains much high frequency components, as in the case of a monoscope test pattern. The curve $C_2$ represents the frequency characteristic of the low pass filter 30 when its cutoff frequency is lowered in response to the detection of the noted particular frequency band in the frequency modulated video signal from the switching circuit 20.

With reference back to FIG. 1 a line 48 branches off from the output line 26 of the switching circuit 20 and leads to circuit means for the detection of the noted particular frequency band of the frequency modified video signal being retrieved from the tape 12. Such circuit means comprises an automatic gain control (AGC) circuit 50, a band elimination filter 52, an amplifier 54 and a detector 56, all interconnected in series in that order from the switching circuit 20 toward the voltage dependent low pass filter 30. It is understood that both AGC circuit 50 and trap filter 52 include a buffer circuit.

Figure 4:
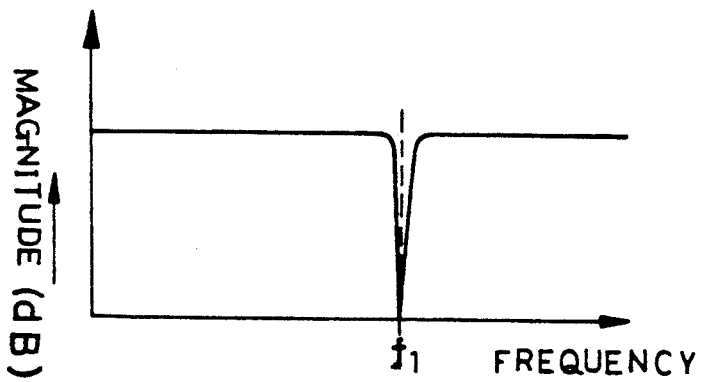
FIG. 4 is a graph explanatory of the performance of the band elimination filter included in the video tape recorder of FIG. 1.

The AGC circuit 50 functions to automatically control the magnitude of the incoming frequency modulated video signal retrieved from the tape 12. The band elimination filter 52, sometimes referred to as a trap, has a frequency characteristic graphically represented in FIG. 4, such that its output magnitude sharply decreases at a particular frequency $f_1$ or band of frequencies. In this particular embodiment of my invention, the band elimination filter 52 rejects those frequencies in the frequency modulated video signal which represent the gray range of brightness in the reproduced image, that is, the attenuation band of the filter 52 is equivalent to gray frequencies.

The detector 56 functions to detect an envelope of the amplified output from the band elimination filter 52 and to put out an equivalent direct voltage. This direct voltage is applied to the field effect transistor 44, FIG. 2, of the voltage dependent low pass filter 30 over the line 46. The detector 56 comprises three transistors 58, 60 and 62, two capacitors 64 and 66, four resistors 68, 70, 72 and 74, two diodes 78 and 80, a bias circuit 82, and a constant voltage source Vcc, which are all connected as shown.

Operation

I will now describe the operation of the video tape recorder 10, constructed as set forth hereinbefore with reference to FIGS. 1-4, as applied to the playback of a monochrome video signal that has been prerecorded on the magnetic tape 12. For such operational description I will refer also to FIG. 5 which shows at (A)-(E) the signal waveforms appearing in various parts of the FIG. 1 circuitry. In FIG. 1, therefore, I have indicated by the same capitals A-E the parts where the corresponding waveforms (A)-(E) of FIG. 5 appear.

As the magnetic tape 12 travels past the rotary head assembly 14 in rotation, the pair of electromagnetic transducers or video heads 16 will alternately scan the tape for retrieving the frequency modulated monochrome video signal therefrom. The signal components retrieved by the two video heads 16 will be individually amplified by the amplifiers 24 and combined into the complete frequency modulated video signal by the switching circuit 20. At (B) in FIG. 5 is shown the unmodulated video signal which has been obtained by subsequently demodulating the output from the switching circuit 20 by the demodulator 28.

It is assumed that the frequency modulated video signal retrieved as above includes a gray signal component. Therefore, in the unmodulated video signal shown in FIG. 5(B), a gray waveform portion appears in the middle of the signal fraction corresponding to one horizontal scanning period, the remaining portions being shown to be more or less of black level.

The frequency modulated video signal from the switching circuit 20 contains frequency components corresponding to the various levels of brightness of the image to be reproduced; that is, it contains high frequency components corresponding to the white level, low frequency components corresponding to the black level, and intermediate frequency components corresponding to the gray level. My invention is specifically directed to noise reduction from the gray level frequencies in this particular embodiment. It will be understood, then, that such gray level frequencies constitute the attenuation band of the band elimination filter 52.

Inputting this frequency modulated video signal from the switching circuit 20, the AGC circuit 50 functions to make its amplitude constant. The resulting output from the AGC circuit 50 is given at (A) in FIG. 5. In this waveform diagram, however, I have omitted the illustration of the frequency variations inherent in the frequency modulated video signal.

Figure 5A:
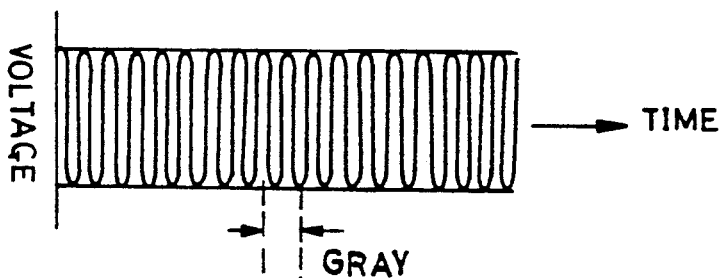
FIG. 5, consisting of (A)–(E), is a series of waveform diagrams explanatory of the operation of the noise reduction system in the video tape recorder of FIG. 1.
Figure 5B:
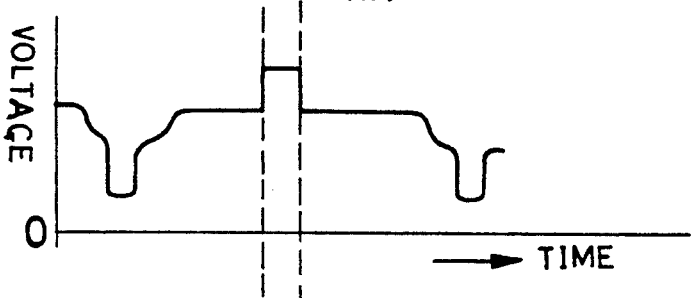

The band elimination filter 52 rejects the gray frequency components of the FIG. 5(A) output from the AGC circuit 50. Consequently, the output from the band elimination filter 52 will be substantially as depicted at (C) in FIG. 5, with the signal amplitude drastically reduced at the gray frequency components.

Figure 5C:
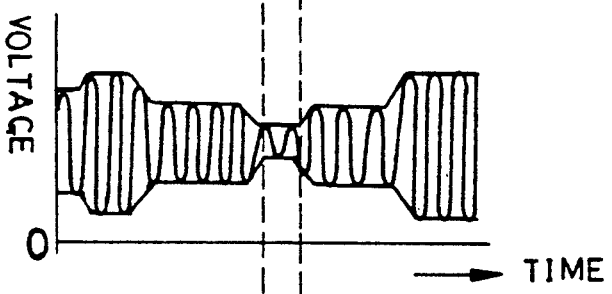
Figure 5D:
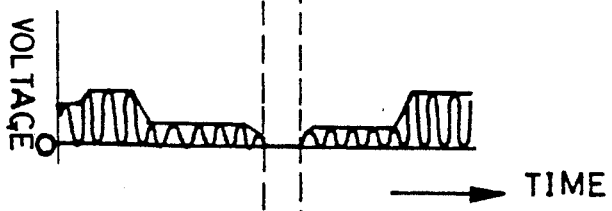

The FIG. 5(C) output from the band elimination filter 52 will be applied to the base of the emitter follower transistor 58 of the detector 56 via the capacitor 64, thereby to have the central voltage of its amplitude lowered as shown at (D) in FIG. 5. This FIG. 5(D) signal will then be applied to the base of the PNP transistor 22 thereby to have its envelope detected between the base and emitter of this transistor. Then the transistor 62 will invert the detected envelope of the FIG. 5(D) signal. At (E) in FIG. 5 is shown the resulting direct voltage output from the detector 56.

Figure 5E:
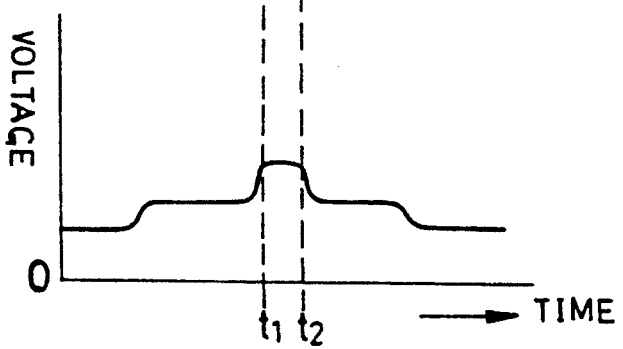

As will be seen by referring to FIG. 2 again, the FIG. 5(E) output from the detector 56 will be applied to the gate of the field effect transistor 44 of the voltage dependent low pass filter 30. Consequently, since the resistance offered by the field effect transistor 44 will decrease at the highest part $t_1-t_2$ of the FIG. 5(E) voltage curve, which part corresponds to the gray level portion of the FIG. 5(A) waveform, the cutoff frequency of the low pass filter 30 will decrease from $C_1$ to $C_2$ in FIG. 3 in response to the highest voltage part $t_1-t_2$. Thus the voltage dependent low pass filter 30 will function to cut off noise frequencies that are higher than its reduced cutoff frequency and which may be contained in the gray level portions of the FIG. 5(B) video signal from the demodulator 28.

The foregoing will have made clear how noise is reduced only from the gray zones of the reproduced image. It will also be understood that the noise reduction by the voltage dependent low pass filter 30 takes place in real time, that is, concurrently with the retrieval of the video signal from the tape 12. The cutoff frequency of the low pass filter 30 is high, as represented by the curve $C_1$ in FIG. 3, when the black level portions of the FIG. 5(B) signal are traveling therethrough. Accordingly, the reproduced image as a whole suffers hardly any noticeable loss in resolution.

With the noise frequencies cut off only from its gray level portions, the video signal will travel from the voltage dependent low pass filter 30 to the output of the video recorder 10, in order to be visually reproduced on a television receiver of conventional make. The deemphasis circuit 32, low pass filter 34 and amplifier 36 connected between voltage dependent low pass filter and recorder output are all conventional in the art.

Second Form

FIG. 6 shows a multiple level noise reduction system which can be incorporated with the video player 10 in place of the single level noise reduction system set forth in the foregoing. The multiple level noise reduction system includes a plurality of band elimination filters 52-1 through 52-n connected to the output of the AGC circuit 50 in lieu of the single band elimination filter 52 of FIG. 1. The band elimination filters 52-1 through 52-n are intended for the detection of those frequency components of the frequency modulated video signal which correspond to various other brightness levels. Typically, in this multiple level noise reduction system, the attenuation bands of the band elimination filters 52-1 through 52-n correspond to various preselected tones of gray.

Outputs from these band pass filters are applied via amplifiers 54-1 through 54-n to detectors 56-1 through 56-n, respectively. The detectors 56-1 through 56-n can be substantially identical in construction with the detector 56 shown in FIG. 1. However, the detectors 56-1 through 56-n produce voltages $V_1$ through $V_n$ of different magnitudes corresponding to the various brightness levels detected.

The outputs of all the detectors 56-1 through 56-n are connected to a modified voltage dependent low pass filter 30a by way of a common output line 46. This modified low pass filter is to be connected between the demodulator 28 and deemphasis circuit 32 of the FIG. 1 video recorder 10 in place of the voltage dependent low pass filter 30 of the FIG. 2 construction.

The modified voltage dependent low pass filter 30a includes a parallel circuit of a resistor 38a and a field effect transistor 46a inserted in the signal line 84 leading from the demodulator 28 and deemphasis circuit 32 of the FIG. 1 video recorder 10. The field effect transistor 46a has its gate connected to the common output line 46 of the detectors 56-1 through 56-n. A serial circuit of a resistor 40a and a capacitor 42a is connected between signal line 84 and ground.

In operation, as the AGC circuit 50 puts out the frequency modulated video signal of constant amplitude depicted in FIG. 5(A), the set of band elimination filters 52-1 through 52-n will individually reject those frequency bands which correspond to various preselected tones of gray. The resulting outputs from the band elimination filters will be subsequently amplified by the amplifiers 54-1 through 54-n and then detected by the detectors 56-1 through 56-n.

The field effect transistor 46a of the voltage dependent low pass filter 30a functions as variable resistor, responsive to the variable voltage outputs from the detectors 56-1 through 56-n. Since these detectors produce voltages of different magnitudes upon detection of the various tones of gray represented by the video signal, the voltage dependent low pass filter 30a will have its cutoff frequency lowered to various predetermined values suiting the various preselected tones of gray for eliminating high frequency noise therefrom.

Third Form

Figure 7:
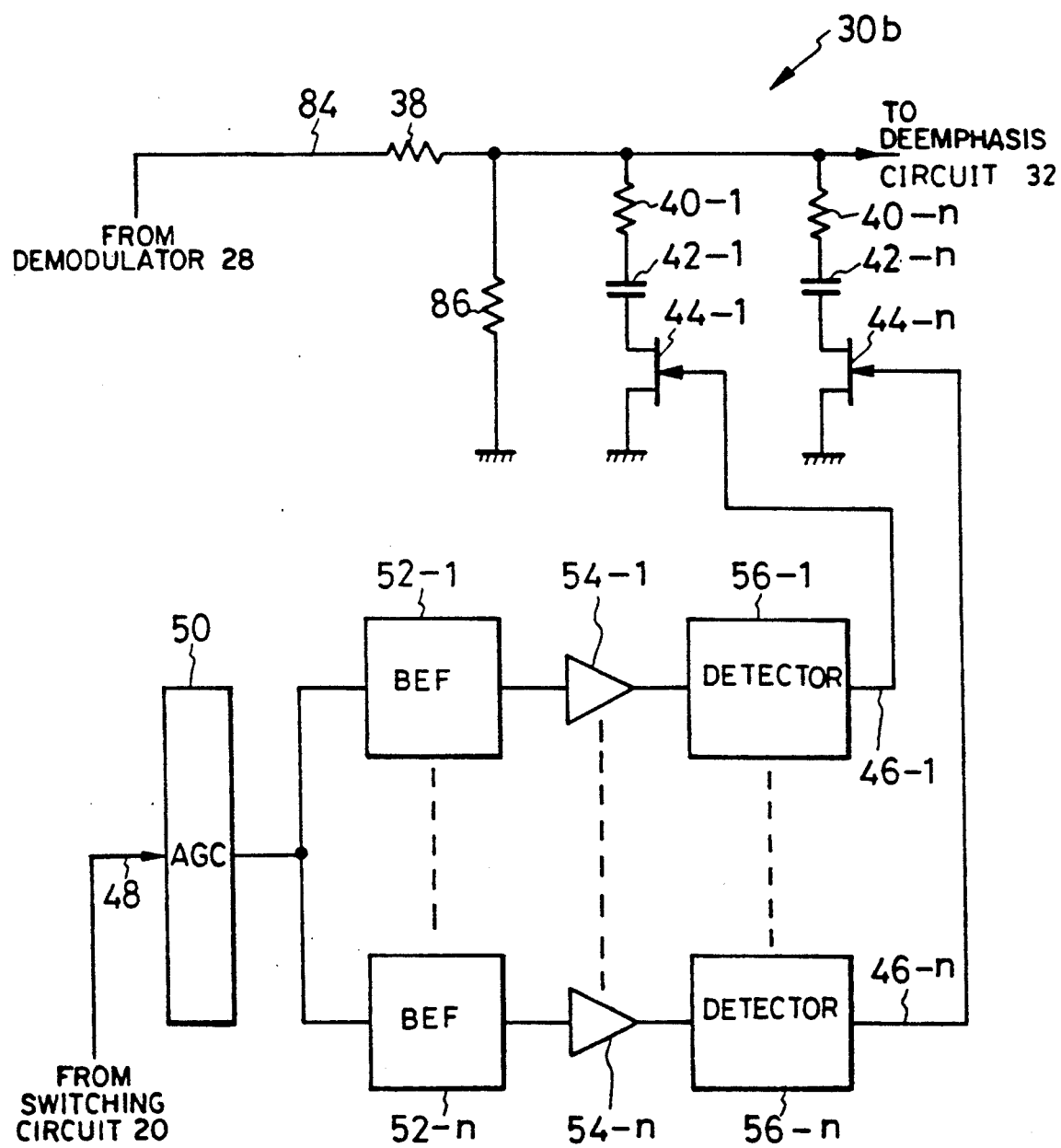
FIG. 7 is a block diagram of still another preferred form of noise reduction system according to my invention.

FIG. 7 shows another multiple level noise reduction system according to my invention. This alternate multiple level noise reduction system differs from that of FIG. 6 in that the detectors 56-1 through 56-n put out voltages of the same magnitude upon detection of various tones of gray in the frequency modulated video signal being retrieved.

For multiple level noise reduction, the detectors 56-1 through 56-n are individually connected to as many voltage dependent low pass filters 30b connected to the signal line 84 between the demodulator 28 and deemphasis circuit 32 of the FIG. 1 video recorder 10. The voltage dependent low pass filters 30b are each identical in construction with the FIG. 2 filter 30, comprising resistors 40-1 through 40-n, capacitors 42-1 through 42-n, and field effect transistors 44-1 through 44-n. The detectors 56-1 through 56-n are separately connected to the gates of the field effect transistors 44-1 through 44-n via lines 46-1 through 46-n, respectively. A resistor 86 is additionally connected between signal line 84 and ground. The other details of construction are as set forth above with reference to FIG. 6.

In operation, as the detectors 56-1 through 56-n detect various preselected tones of gray represented by the frequency modulated video signal, they will deliver voltages of the same magnitude to the respective field effect transistors 44-1 through 44-n of the voltage dependent low pass filters 30b. The cutoff frequencies of these filters will be lowered to various predetermined degrees as the signal line 84 is grounded via the capacitors 42-1 through 42-n having different capacitances.

Possible Modifications

Although I have shown and described my invention in highly specific aspects thereof, I do not wish my invention to be limited by the exact details of the foregoing disclosure. The following, then, is a brief list of possible modifications or alterations of the illustrated embodiments which I believe all fall within the scope of my invention:

1. My invention could be applied to noise reduction from color video signals.

2. The band elimination filter 52 in the FIG. 1 video recorder 10 could be replaced by a band pass filter, and the amplifier 54 by an inverting amplifier.

3. The voltage dependent low pass filter 30 could be connected between deemphasis circuit 32 and low pass filter 34.

4. In order to further reduce the loss of resolution due to the elimination of a high frequency component by the voltage dependent low pass filter 30, its cutoff frequency might be lowered shortly after the moment $t_1$ in FIG. 5 and returned to the normal value at the moment $t_2$.

5. Also, for the same purpose, the cutoff frequency of the voltage dependent low pass filter 30 might be lowered after the moment $t_1$ and returned to the normal value before the moment $t_2$.

What I claim is:

1. A video playback device of the type having transducer means for retrieving a frequency modulated video signal from a record medium, and a demodulator for demodulating the frequency modulated video signal into an unmodulated video signal, wherein the improvement resides in a noise reduction system comprising:
   (a) a low pass filter connected to an output of the demodulator, the low pass filter having a variable cutoff frequency which is normally sufficiently high to pass the unmodulated video signal from the demodulator; and
   (b) detector means connected to the transducer means for detecting a preselected band of frequencies included in the frequency modulated video signal being retrieved from the record medium, the detector means being also connected to the low pass filter for decreasing the cutoff frequency thereof to a predetermined value when the frequencies in the preselected band are detected in the frequency modulated video signal.

2. The video playback device of claim 1 wherein the low pass filter has its cutoff frequency varied in response to an input voltage, and wherein the detector means comprises:
   (a) a band elimination filter connected to the transducer means for attenuating the preselected band of frequencies in the frequency modulated video signal; and
   (b) a detector connected between the band elimination filter and the low pass filter for detecting an output from the band elimination filter and applying a variable output voltage to the low pass filter for varying the cutoff frequency thereof.

3. The video playback device of claim 2 wherein the detector means further comprises an automatic gain control circuit connected between the transducer means and the band elimination filter for making the frequency modulated video signal constant in amplitude.

4. A video playback device of the type having transducer means for retrieving a frequency modulated video signal from a record medium, and a demodulator for demodulating the frequency modulated video signal into an unmodulated video signal, wherein the improvement resides in a multiple level noise reduction system comprising:
   (a) low pass filter means connected to an output of the demodulator, the low pass filter means having a variable cutoff frequency which is normally sufficiently high to pass the unmodulated video signal from the demodulator;
   (b) detector means connected to the transducer means for detecting a plurality of different preselected bands of frequencies included in the frequency modulated video signal being retrieved from the record medium, the detector means being also connected to the low pass filter means for decreasing the cutoff frequency thereof to different predetermined values when the frequencies in the preselected bands are detected in the frequency modulated video signal;
   (c) whereby high frequency noise can be removed from particular levels of brightness represented by the preselected bands of frequencies in the frequency modulated video signal.

5. A video playback device of the type having transducer means for retrieving a frequency modulated video signal from a record medium, and a demodulator for demodulating the frequency modulated video signal into an unmodulated video signal, wherein the improvement resides in a multiple level noise reduction system comprising:
   (a) a voltage dependent low pass filter connected to an output of the demodulator, the low pass filter having a variable cutoff frequency which is normally sufficiently high to pass the unmodulated video signal from the demodulator and which is lowered to different preselected values in response to input voltages of different magnitudes; and
   (b) a plurality of detector means connected to the transducer means for detecting a plurality of different preselected bands of frequencies included in the frequency modulated video signal being retrieved from the record medium, the detector means being also connected to the low pass filter for applying the voltages of different magnitudes thereto and hence for decreasing the cutoff frequency thereof to the different preselected values when the frequencies in the preselected bands are detected in the frequency modulated video signal;

(c) whereby high frequency noise can be removed from particular levels of brightness represented by the preselected bands of frequencies in the frequency modulated video signal.

6. The video playback device of claim 5 wherein each detector means comprises:

(a) a band elimination filter connected to the transducer means for attenuating one of the preselected bands of frequencies in the frequency modulated video signal; and (b) a detector connected between the band elimination filter and the voltage dependent low pass filter for detecting an output from the band elimination filter and applying a variable output voltage to the low pass filter for varying the cutoff frequency thereof.

7. The video playback device of claim 6 further comprising an automatic gain control circuit connected between the transducer means and the band elimination filters of the detector means for making the frequency modulated video signal constant in amplitude.

8. A video playback device of the type having transducer means for retrieving a frequency modulated video signal from a record medium, and a demodulator for demodulating the frequency modulated video signal into an unmodulated video signal, wherein the improvement resides in a multiple level noise reduction system comprising:

(a) a plurality of voltage dependent low pass filters connected to an output of the demodulator, each low pass filter having a variable cutoff frequency which is normally sufficiently high to pass the unmodulated video signal from the demodulator and which is lowered to a different preselected value in response to an input voltage of different magnitude; and (b) a plurality of detector means connected to the transducer means for detecting a plurality of different preselected bands of frequencies included in the frequency modulated video signal being retrieved from the record medium, the detector means being also connected respectively to the low pass filters for providing said input voltage to said low pass filter means and hence for decreasing the cutoff frequencies thereof to the different preselected values when the frequencies in the preselected bands are detected in the frequency modulated video signal;

(c) whereby high frequency noise can be removed from particular levels of brightness represented by the preselected bands of frequencies in the frequency modulated video signal.

9. The video playback device of claim 8 wherein each detector means comprises:

(a) a band elimination filter connected to the transducer means for attenuating one of the preselected bands of frequencies in the frequency modulated video signal; and (b) a detector connected between the band elimination filter and one of the voltage dependent low pass filters for detecting an output from the band elimination filter and applying an output voltage to the low pass filter for varying the cutoff frequency thereof.

10. The video playback device of claim 9 further comprising an automatic gain control circuit connected between the transducer means and the band elimination filters of the detector means for making the frequency modulated video signal constant in amplitude.

* * * * *